United States Patent
Knauth et al.

(10) Patent No.: US 9,092,214 B2
(45) Date of Patent: Jul. 28, 2015

(54) SIMD PROCESSOR WITH PROGRAMMABLE COUNTERS EXTERNALLY CONFIGURED TO COUNT EXECUTED INSTRUCTIONS HAVING OPERANDS OF PARTICULAR REGISTER SIZE AND ELEMENT SIZE COMBINATION

(75) Inventors: Laura A. Knauth, Portland, OR (US); Matthew C. Merten, Hillsboro, OR (US); Ronak Singhal, Hillsboro, OR (US); Hugh M. Caffey, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 647 days.

(21) Appl. No.: 13/434,564

(22) Filed: Mar. 29, 2012

(65) Prior Publication Data

US 2013/0262837 A1  Oct. 3, 2013

(51) Int. Cl.
*G06F 15/80* (2006.01)
*G06F 9/30* (2006.01)
*G06F 11/34* (2006.01)

(52) U.S. Cl.
CPC ........ *G06F 9/30109* (2013.01); *G06F 9/30112* (2013.01); *G06F 11/3409* (2013.01); *G06F 11/3466* (2013.01); *G06F 2201/88* (2013.01)

(58) Field of Classification Search
CPC ............ G06F 9/30145; G06F 2201/88; G06F 11/3409; G06F 2201/865; G06F 9/30109
USPC ........... 712/E9.028, 208, 210, E9.03, E9.039; 717/127
See application file for complete search history.

(56) References Cited

U.S. PATENT DOCUMENTS

| | | | | |
|---|---|---|---|---|
| 5,257,358 A * | 10/1993 | Cohen | ......................... | 714/38.12 |
| 7,516,334 B2 * | 4/2009 | Suzuoki et al. | ............... | 713/300 |
| 7,779,237 B2 * | 8/2010 | Correale et al. | ............... | 712/221 |
| 8,413,120 B2 * | 4/2013 | Emberling | ................... | 717/127 |
| 8,504,805 B2 * | 8/2013 | Golla et al. | ................... | 712/222 |

* cited by examiner

*Primary Examiner* — Kenneth Kim
(74) *Attorney, Agent, or Firm* — Nicholson De Vos Webster & Elliott LLP

(57) ABSTRACT

A processor includes an execution unit to execute instructions, where each operand of each executed instruction has one or more elements of an element size and at least one operand of the instruction corresponds to a register of a register size. The processor further includes a counter configured to count a number of instructions that have been executed by the execution unit associated with a particular combination of register size and element size.

14 Claims, 9 Drawing Sheets

| Main Event: 208 | FP_Arith_Inst_Retired (e.g., ADD SUB MUL DIV MIN MAX RECIP SQRT FMA) | |
|---|---|---|
| Subevent # 209 | Type 301 | Multiplier (e.g., by SW) 302 |
| 0 | scalar double | 1 |
| 1 | scalar single | 1 |
| 2 | 128b packed double | 2 |
| 3 | 128b packed single | 4 |
| 4 | 256b packed double | 4 |
| 5 | 256b packed single | 8 |
| 6 | 512b packed double | 8 |
| 7 | 512b packed single | 16 |
| ... | ... | ... |

FIG. 3

| Counter 0<br>(SW multiplier = 1)<br>Subevents 0 & 1:<br><br>scalar_single and scalar_double | Counter 1<br>(SW multiplier = 2)<br>Subevent 2:<br><br>128b packed double |
|---|---|
| Counter 2<br>(SW multiplier = 4)<br>Subevents 3 & 4:<br><br>256b_packed_double and 128b_packed_single | Counter 3<br>(SW multiplier = 8)<br>Subevent 5:<br><br>256b packed single |

FIG. 4

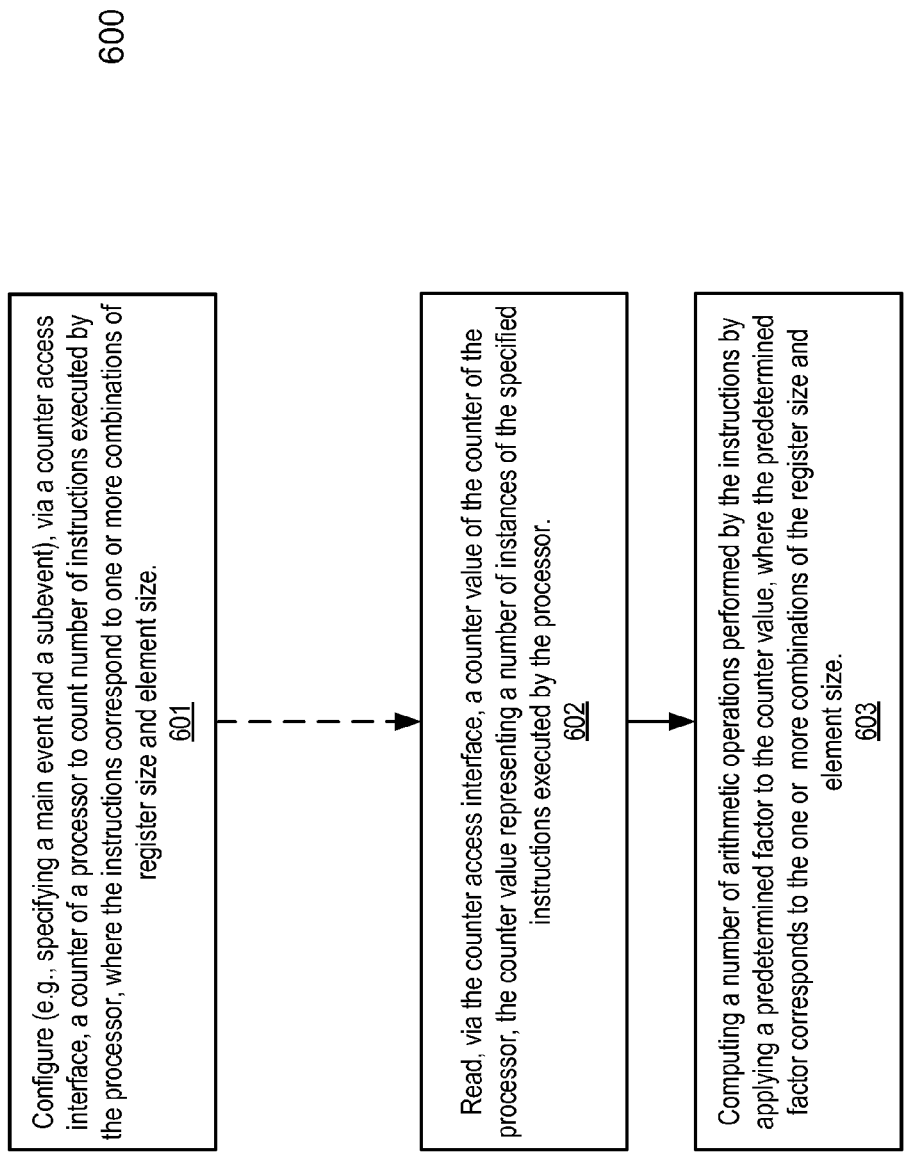

SIMD PROCESSOR WITH PROGRAMMABLE COUNTERS EXTERNALLY CONFIGURED TO COUNT EXECUTED INSTRUCTIONS HAVING OPERANDS OF PARTICULAR REGISTER SIZE AND ELEMENT SIZE COMBINATION

FIELD OF THE INVENTION

Embodiments of the present invention relate generally to performance monitoring of processors. More particularly, embodiments of the invention relate to programmable counters for counting floating-point operations of a processor.

BACKGROUND

The high-performance computing (HPC) community, both hardware vendors and software developers, rely on an accurate count of floating-point operations executed. These measurements are used in a variety of ways, including distinguishing a system's actual computing floating-point operation (FLOP) performance compared to its advertised peak FLOP performance, and analyzing applications for the percentage of scalar FLOPs compared with packed FLOPs. Static analysis of the application to obtain this information can be difficult because during the execution, codes paths through the application may vary based on dynamic conditions, such as array alignment in memory, loop iteration counts dependent upon input problem size, and loop iteration counts dependent on algorithmic convergence requirements. Scalar operations are often used when data packing is not possible due to memory communication between the loop iterations, and are also used to "peel" iterations of a loop to achieve a particular memory alignment for packed memory operations.

FLOP has a precise definition within the HPC community, and it refers to single- or double-precision arithmetic operations (i.e., add, subtract, multiply, and divide), and does not include memory or logical operations. The some compound instructions, such as Fused Multiply Add (FMA) instructions count as multiple, in this example, two FLOPS, one for the multiply and one for the add. Each element in a packed single-instruction-multiple-data (SIMD) arithmetic operation counts as a FLOP (two in the case of an FMA). For example, a 256-bit packed single-precision (32-bit) floating-point add operates on 8 elements, and thus counts 8 FLOPs. Scalar operations use the full SIMD register data path, but only operate on a single element, and therefore only count 1 FLOP (2 in the case of FMA). There has been a lack of efficient mechanism that can accurately count the FLOPs in such an operating environment.

BRIEF DESCRIPTION OF THE DRAWINGS

Embodiments of the invention are illustrated by way of example and not limitation in the figures of the accompanying drawings in which like references indicate similar elements.

FIG. 3 is a block diagram illustrating mapping of subevents used to program GPCs according one embodiment of the invention.

FIG. 4 is a block diagram illustrating mapping of subevents used to program GPCs according another embodiment of the invention.

FIG. 6 is a flow diagram illustrating a method for determining arithmetic operations performed by certain instructions according to another embodiment of the invention.

DETAILED DESCRIPTION

Figure 1:
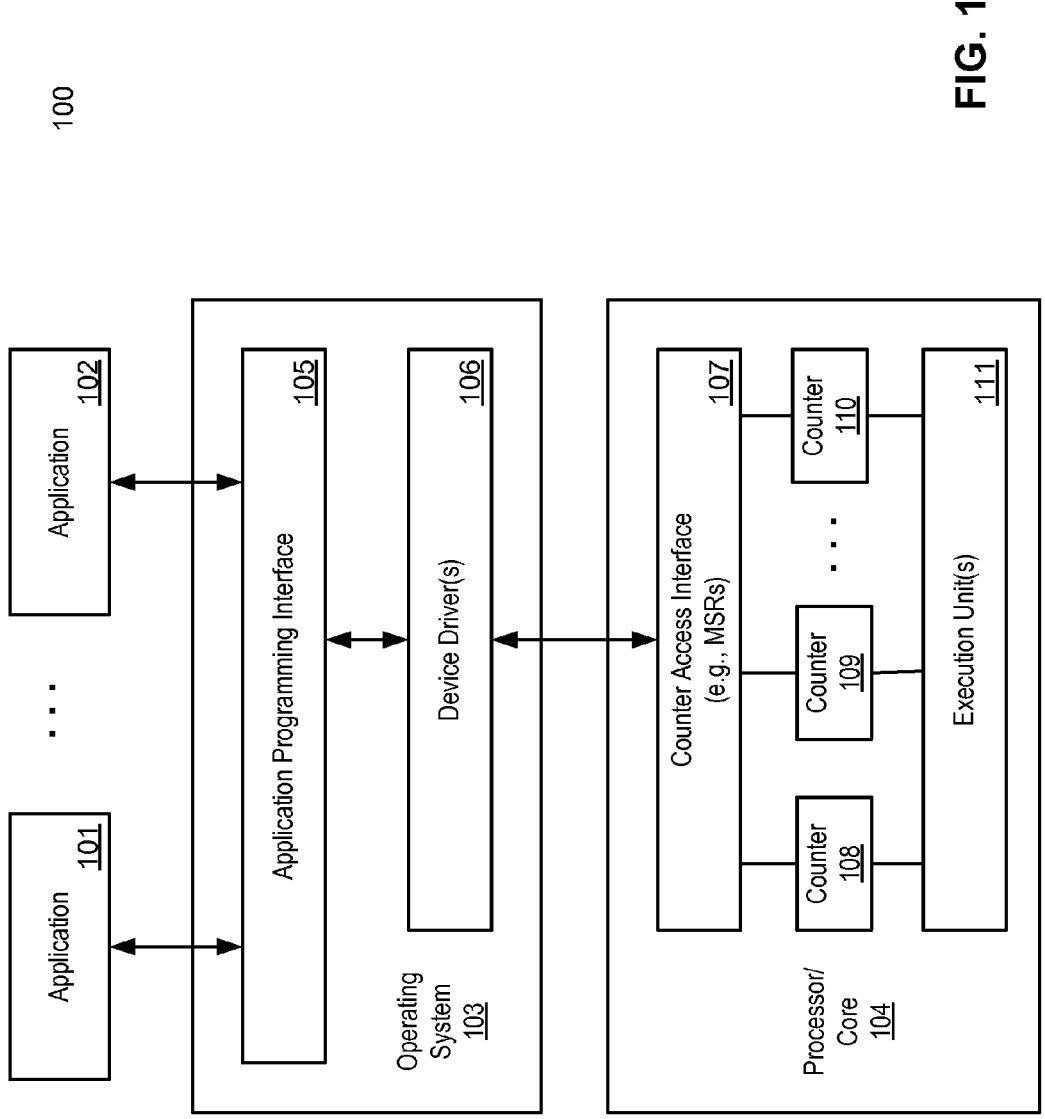
FIG. 1 is a block diagram illustrating a system for counting FLOPs according to one embodiment of the invention.

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment.

According to some embodiments, one or more counters, such as general-purpose counters (GPCs), specific-purpose or fixed counters, of a processor or processor core are programmed to count FLOPs performed by specific instructions in various combinations of instruction types and/or instruction sizes. A set of one or more registers are configured as a counter access interface of the counters to allow a software component to specifically configure which of the counters to count number of a particular type of instructions executed or retired representing a particular type of arithmetic operations such as FLOPs performed by the instructions in which of combinations of instruction types and/or instruction sizes, which may be represented by register sizes and/or element sizes (e.g., 32-bit/64-bit/128-bit/256-bit/512-bit/1024-bit, scalar/packed, single/double precision). The counters are configured to count a number of instances of different combination of instructions with different instruction types/sizes executed or retired. Based on different instruction types/sizes, the software component can apply different factors such as multipliers to compute the actual number of arithmetic operations performed by the instructions counted. Further, combinations of register sizes and elements sizes that result in the same arithmetic operations factor or multiplier could be counted at the same time in the same counter. In one embodiment, instead of counting the arithmetic operations of instructions prior to or at the time of execution (which may or may not actually be executed and retired) used by a conventional method, the counters are configured to count instances of the instructions to represent the arithmetic operations of the instructions that have actually been executed and retired from the execution units. As a result, the calculated arithmetic operations are far more accurate than the conventional methods. Throughout this application, GPCs are utilized as examples of counters of a processor or processor core; however, other types of counters such as specific-purpose or fixed counters (e.g., specifically configured or hardwired to count certain events) can also be applied herein. In addition, FLOPs are utilized as examples of arithmetic operations to be calculated; other arithmetic operations such as shifts, etc., can also be applied herein.

FIG. 1 is a block diagram illustrating a system for counting FLOPs according to one embodiment of the invention. Referring to FIG. 1, system 100 includes one or more applications (e.g., performance analytic applications) to access processor 104 via operating system 103. Specifically, according to one embodiment, processor 104 includes a set of counters 108-110 to count number of particular types of instructions retired representing certain types of arithmetic operations such as FLOPs performed by instructions executed by one or more execution units 111. Different counters can be programmed by a software component such as applications 101-102 to count FLOPs performed by instructions of a particular type and size, referred to herein as a combination of instruction type/size. According to one embodiment, processor 104 includes programmable counter interface 107 to allow a software component to program counters 108-110 and to retrieve the count values produced by counters 108-110.

In one embodiment, operating system 103 includes an application programming interface (API) 105 to allow applications 101-102 to access certain functionalities of operating system 103 and one or more device drivers 106 configured to access certain hardware and/or firmware of system 100. In this embodiment, device driver 106 is running at a privileged level of operating system 103 (e.g., kernel level or ring zero level or supervisor level) specifically configured to access GPCs 108-110. That is, applications 101-102 do not have privileges to directly access GPCs 108-110; rather, applications 101-102 call one or more specific function calls to API 105, which in turn accesses device driver 106. Device driver 106 then accesses programmable counter interface 106 to program GPCs 108-110 and/or to retrieve count values from GPCs 108-110.

According to one embodiment, programmable counter interface 107 may include a set of one or more registers that can be accessed by device driver 106. For example, the set of one or more registers may be a set of one or more model specific registers (MSRs) of which device driver 106 can specify which of counters 108-110 to compute FLOPs performed by instructions of a particular type or types (e.g., opcodes presenting instructions such as ADD, SUB, MUL, DIV, MIN, MAX, RECIP, SQRT, FMA, etc.) in a particular size or width (e.g., 32-bit, 64-bit, 128-bit, 256-bit, 512-bit, or 1024-bit, scalar or packed). In one embodiment, a GPC may be selected and programmed based on a particular register size and an element size (e.g., single or double precision) or a number of elements packed (e.g., scalar or packed instruction) within a particular type of instructions. In one embodiment, instead of compute the FLOPs of instructions prior to or at the time of execution (which may or may not actually be executed) used by a conventional method, the counters 108-110 are configured to count number of instances of instructions performing the FLOPs that have actually been executed and retired from the execution units 111. As a result, the counted FLOPs are far more accurate than the conventional method.

Figure 2:
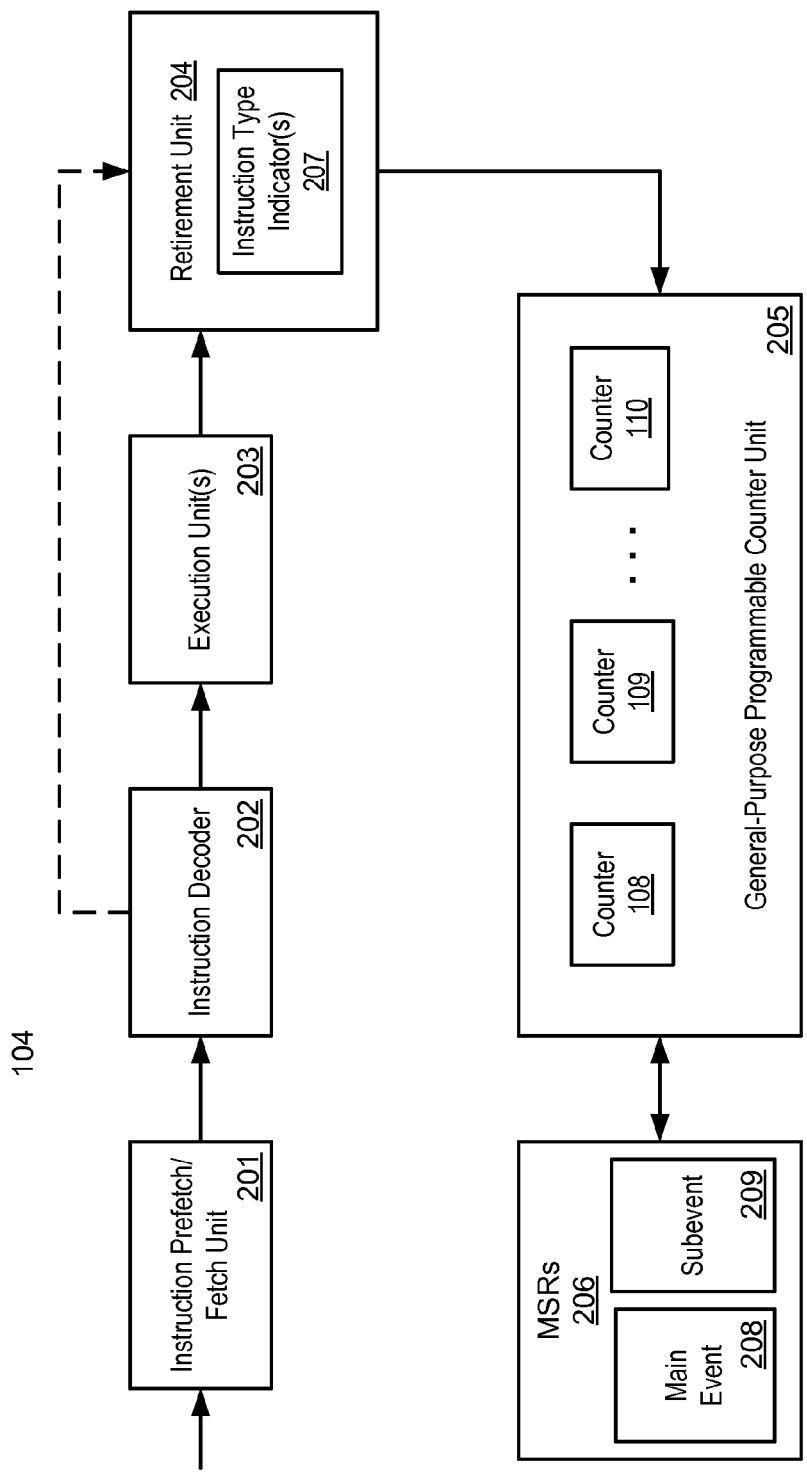
FIG. 2 is a block diagram illustrating an example of a processor according one embodiment of the invention.

FIG. 2 is a block diagram illustrating an example of a processor according one embodiment of the invention. Referring to FIG. 2, processor 104 may represent any kind of instruction processing apparatuses. For example, processor 104 may be a general-purpose processor. Processor 104 may be any of various complex instruction set computing (CISC) processors, various reduced instruction set computing (RISC) processors, various very long instruction word (VLIW) processors, various hybrids thereof, or other types of processors entirely. In one embodiment, processor 104 includes, but is not limited to, instruction fetch unit 201, instruction decoder 202, one or more execution units 203, retirement unit 204, and GPC counter unit 205 having programmable GPCs 108-110, which are accessible by a software component via MSRs 206.

Instruction fetch unit 201 is configured to fetch or prefetch instructions from an instruction cache or data from memory. Instruction decoder 202 is to receive and decode instructions from instruction fetch unit 201. Instruction decoder 202 may generate and output one or more micro-operations, micro-code, entry points, microinstructions, other instructions, or other control signals, which reflect, or are derived from, the instructions. Instruction decoder 202 may be implemented using various different mechanisms. Examples of suitable mechanisms include, but are not limited to, microcode read only memories (ROMs), look-up tables, hardware implementations, programmable logic arrays (PLAs), and the like.

Execution units 203, which may include an arithmetic logic unit, or another type of logic unit capable of performing operations based on instructions, which can be micro-operations or μOps). As a result of instruction decoder 202 decoding the instructions, execution unit 203 may receive one or more micro-operations, micro-code entry points, microinstructions, other instructions, or other control signals, which reflect, or are derived from, the instructions. Execution unit 203 may be operable as a result of instructions indicating one or more source operands (SRC) and to store a result in one or more destination operands (DEST) of a register set indicated by the instructions. Execution unit 203 may include circuitry or other execution logic (e.g., software combined with hardware and/or firmware) operable to execute instructions or other control signals derived from the instructions and perform an operation accordingly. Execution unit 203 may represent any kinds of execution units such as logic units, arithmetic logic units (ALUs), arithmetic units, integer units, etc.

Some or all of the source and destination operands may be stored in registers of a register set or memory. The register set may be part of a register file, along with potentially other registers, such as status registers, flag registers, etc. A register may be a storage location or device that may be used to store data. The register set may often be physically located on die with the execution unit(s). The registers may be visible from the outside of the processor or from a programmer's perspective. For example, instructions may specify operands stored in the registers. Various different types of registers are suitable, as long as they are capable of storing and providing data as described herein. The registers may or may not be renamed. Examples of suitable registers include, but are not limited to, dedicated physical registers, dynamically allocated physical registers using register renaming, combinations of dedicated and dynamically allocated physical registers, etc. Alternatively, one or more of the source and destination operands may be stored in a storage location other than a register, such as, for example, a location in system memory.

Referring back to FIG. 2, according to one embodiment, GPCs 108-110 of GPC unit 205 are programmed to count instances of specific instructions performing FLOPs in various combinations of instruction types and/or instruction sizes. A set of one or more registers MSRs 206 are configured as a counter access interface of the counters 108-110 to allow a software component to specifically specify which of the counters 108-110 to count instances of specific instructions performing certain types of operations such as FLOPs in which of combinations of instruction types and/or instruction sizes, which may be represented by register sizes and element sizes (e.g., 32-bit/64-bit/128-bit/256-bit/512-bit/1024-bit, scalar/packed, single/double precision). The counters 108-110 are configured to count instances of specific instructions with the associated instruction type/size that perform the FLOPs. Based on different instruction types/sizes, the software component can apply different factors such as multipliers to compute the actual number of FLOPs performed by the instructions. In one embodiment, counters 108-110 are configured to count instances of specific instructions performing the FLOPs that have actually been executed by execution unit 203 and retired by retirement unit 204.

According to one embodiment, when an instruction has been executed by execution unit 203, retirement unit 204 is to identify and select one of counters 108-110 based on the instruction type and the elements of the instruction. Retirement unit 204 is then to send a signal to the selected counter to cause the selected counter to increment by an incremental value. In addition, according to one embodiment, if the instruction is a special type of instructions (e.g., combo instructions) that performs multiple FLOPs, which may be indicated by instruction type indicator 207, retirement unit 204 is to signal to the selected GPC to increment multiple incremental values equivalent to the number of individual instructions per element represented therein. Instruction type indicator 207 may be detected by retirement unit 204 or alternatively, by instruction decoder 202 during instruction decoding. For example, a fuse multiply add (FMA) instruction causes a processor to perform a multiplication and addition operations, which counts for two FLOPs. In such a situation, retirement unit 204 is to cause the corresponding counter to count two instances of instructions.

In one embodiment, any of counters 108-110 can be programmed by a software component via MSRs 206, by specifying a main event 208 and subevent 209. Main event 208 is one of the predefined events to access counters 108-110 to count the types of instructions or opcodes such as ADD, SUB, MUL, DIV, MIN, MAX, RECIP, SQRT, FMA, etc. Subevent 209 is to specify the elements associated with the instructions, such as combinations of register sizes and element sizes. In one embodiment, multiple subevents can be counted by a single counter. The software component can also retrieve the count values of counters 108-110 via MSRs 206, for example, either operating in an interrupt mode or operating in a polling mode.

FIG. 3 is a block diagram illustrating mapping of subevents used to program GPCs according one embodiment of the invention. Referring to FIG. 3, main event 208 is to program the counters to count number of instances of instructions performing FLOPs. A software component can write main event 208 to a predetermined MSR register by specifying FP_ARITH_INST_RETIRED, which instructs the GPCs to count FLOPs for a predefined set of instructions such as ADD, SUB, MUL, DIV, MIN, MAX, RECIP, SQRT, and FMA instructions. Subevent 209 includes a set of subevents, each corresponding to a type 301 of instruction represented by a combination of register sizes (e.g., 32-bit, 64-bit, 128-bit, 256-bit, 512-bit, and 1024-bit) and element sizes (e.g., scalar/packed, single/double precision). A GPC may be programmed to count one or more of these types 301 of instructions. Instructions of different combinations of register sizes and element sizes may perform different numbers of FLOPs. A software component that retrieves the count value form the GPCs is responsible applying multiplier 302 to calculate the total FLOPs. For example, an instruction for 512-bit packed instruction with double precision (subevent 6) has 8 FLOPs. When a GPC programmed to count FP_ARITH_INST_RETIRED subevent 6 receives a retirement indication for this 512-bit packed double precision arithmetic instruction from a retirement unit, the counter increment its count value by one. However, when the software component retrieves the count values, it may multiply the count value by a multiplier of 8.

Thus, the total FLOPs for an application can be obtained by counting the number of instructions retired for each register size and element size combination, then multiplying by the number of elements in that combination, then accumulating across the combinations. The subevent control mask 209 specifies which types of instructions will be counted. Multiple subevents can be selected simultaneously. For example, all scalar operations (single- or double-precision) can be counted by setting bit 0 to logical value one and bit 1 to logical value one in the subevent mask. A software consumer then multiplies the count by a known operation count (e.g., multiplier 302) for that subevent.

Note that 256-bit double-precision and 128-bit single-precision have the same FLOP count of 4 since both have 4 elements, but have separate subevents to support single vs. double precision counting. The total FLOPs would then be the sum of each of counter results, multiplied with the corresponding multiplier:

$$FLOPs=1*(scalar\_single \text{ and } scalar\_double)+2*(128b\ packed\ double)+4*(256b\_packed\_double \text{ and } 128b\_packed\_single)+8*(256b\ packed\ single)$$

The total FLOPs count can be obtained in a single run of the application by simultaneously utilizing, for example, four performance monitoring counters, each programmed to the HPC FLOPs configuration, but with different subevents. This subevent configuration also allows for bundling commonly used types: scalar vs. packed and single vs. double, using fewer GPCs as shown in FIG. 4. Note that although only seven subevents have been described, more or fewer subevents may also be applied. Also note that throughout this application, embodiments of the invention are used to count a specific set of arithmetic operations, it is not so limited, and other types of operations may also be counted, such as shifts or ANDs.

Figure 5A:
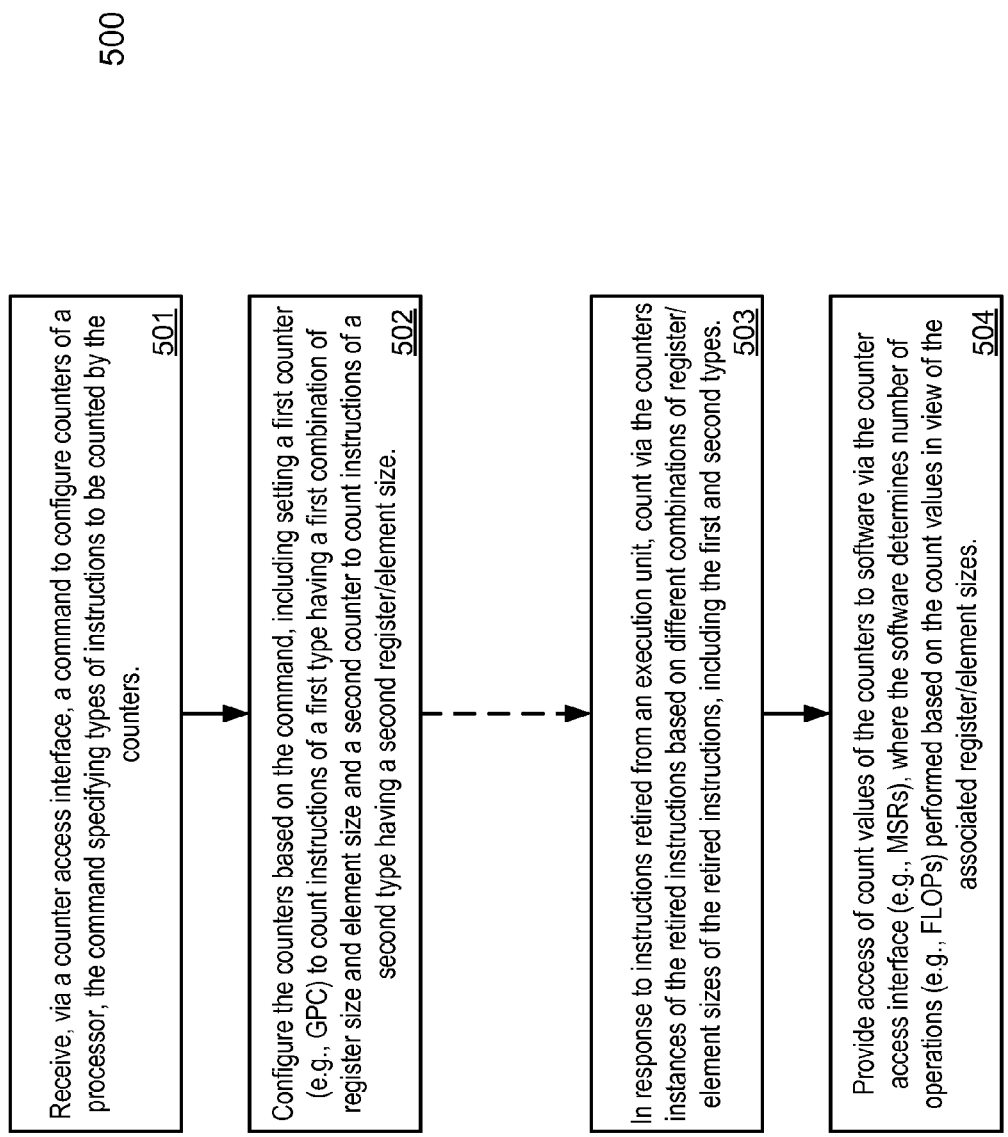
FIGS. 5A and 5B are flow diagrams illustrating a method for counting arithmetic operations according to some embodiments of the invention.
Figure 5B:
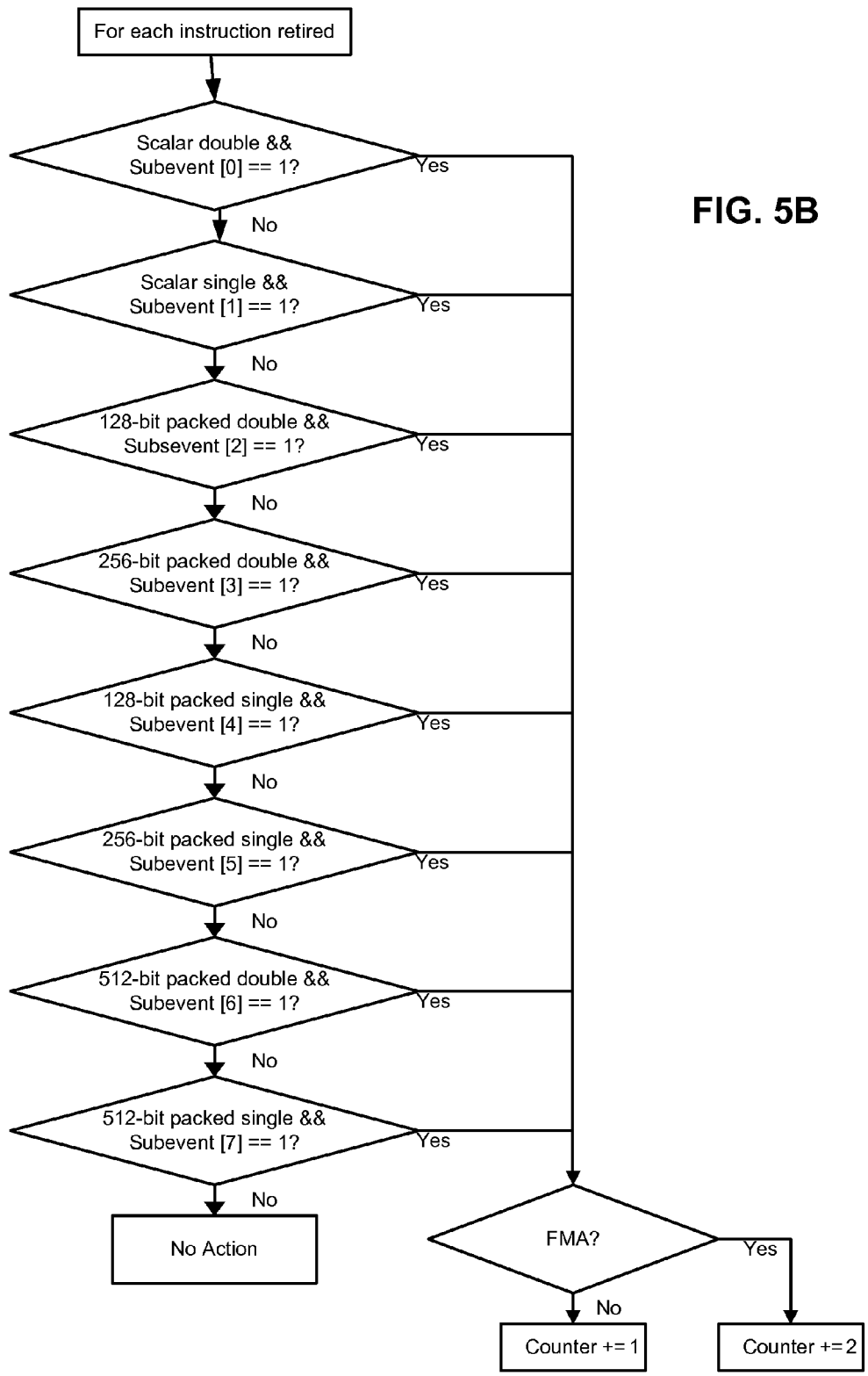

FIG. 5A is a flow diagram illustrating a method for counting FLOPs according to one embodiment of the invention. Method 500 may be performed by processor 104. Referring to FIG. 5A, at block 501, a command is received via a counter access interface (e.g., MSRs) to program one or more counters of a processor, where the command specifies the types of instructions (e.g., main event and subevents) to be counted by the counters. At block 502, the counters are configured based on the command, including configuring a first counter (e.g., GPC) to count instructions of a first type having a first combination of a register size and an element size (register/element size) and configuring a second counter to count instructions of a second type having a second combination of register/element size that is different than the first combination. Subsequently, at block 503, in response to instructions retired from an execution unit, the programmed counters are to count the retired instructions based on different combinations of register/elements sizes, including the first and second combinations. At block 504, the count values are enabled to be accessible to software via a counter access interface (e.g., MSRs). FIG. 5B is a flow diagram illustrating a counting embodiment based on the subevents as shown in FIG. 3.

FIG. 6 is a flow diagram illustrating a method for determining number of arithmetic operations performed by certain instructions according one embodiment of the invention.

Method 600 may be performed by a software application such as applications 101-102 of FIG. 1. Referring to FIG. 6, at block 601, processing logic configures, via a counter access interface such as MSR registers, a counter of a processor or processor core to count number of instructions executed by the processor, where the instructions correspond to one or more combinations of register sizes and element sizes. For example, processing logic may specify a main event and a subevent to specifically select and program a particular counter of the processor to count instances of one or more types of instructions with one or more combinations of register sizes and element sizes, as shown in FIG. 3. The processing logic may configure a counter to count instructions with different combinations of register sizes and element sizes. According to one embodiment, instructions with different combinations of register sizes and element sizes would be counted in the same counter if they are associated with the same factor or multiplier (e.g., performing same amount of arithmetic operations in a cycle), as shown in FIG. 4. Subsequently, at block 602, processing logic retrieves a counter value of the programmed counter from the processor via the counter access interface and at block 603, the processing logic applies a predetermined factor to the counter value to derive a number of arithmetic operations performed by the instructions.

An example of a processor includes an execution unit to execute instructions, where each operand of each executed instruction has one or more elements of an element size and at least one operand of the instruction corresponds to a register of a register size. The processor further includes a counter configured to count a number of instructions that have been executed by the execution unit associated with a particular combination of register size and element size.

Figure 7:
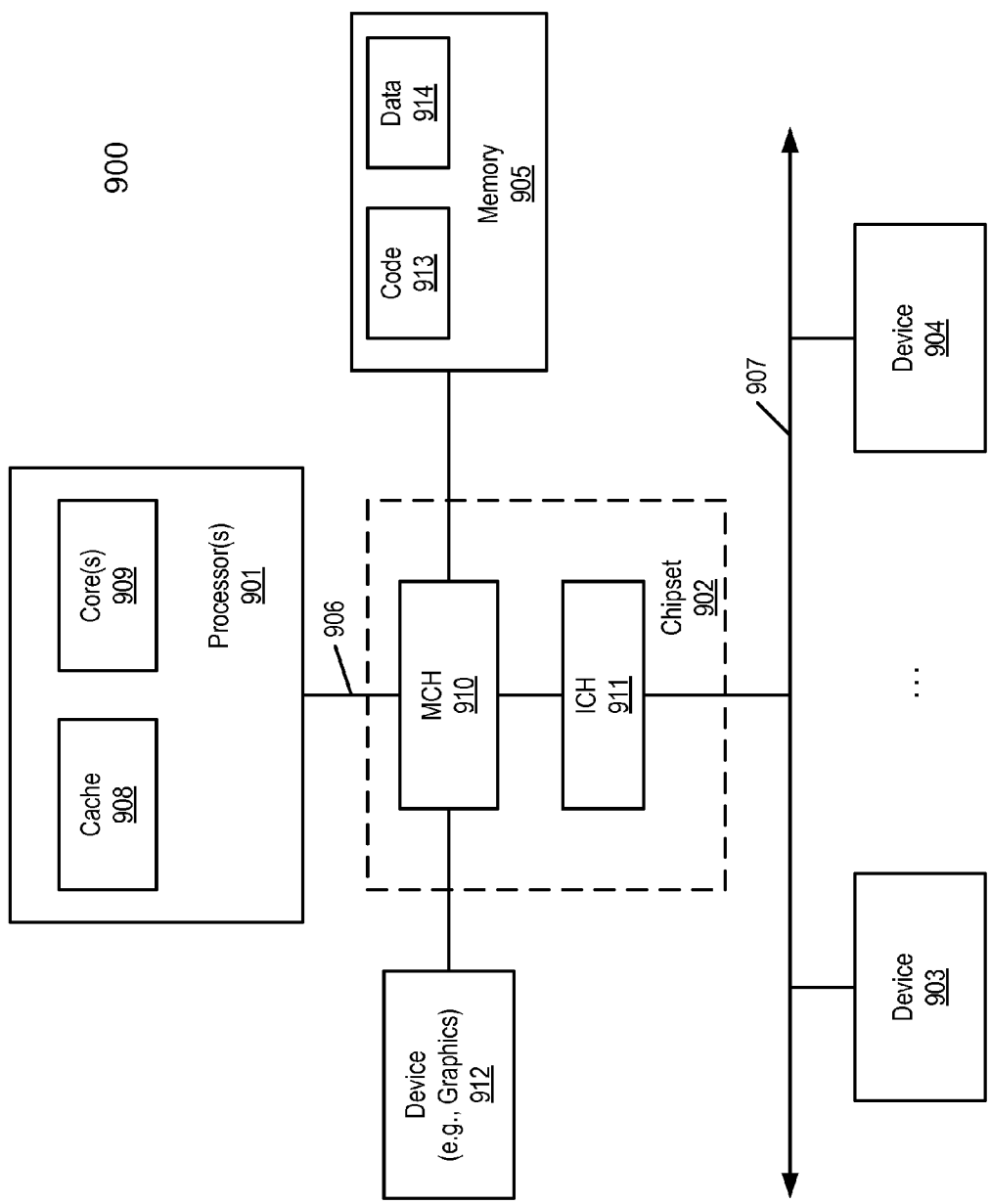
FIG. 7 is a block diagram illustrating an example of a data processing system according to one embodiment.

FIG. 7 is a block diagram illustrating an example of a data processing system according to one embodiment of the invention. System 900 may represent any of the systems described above. For example, system 900 may represent a desktop, a laptop, a tablet, a server, a mobile phone (e.g., Smartphone), a media player, a personal digital assistant (PDA), a personal communicator, a gaming device, a network router or hub, a wireless access point or repeater, a set-top box, or a combination thereof. Note that while FIG. 7 illustrates various components of a data processing system, it is not intended to represent any particular architecture or manner of interconnecting the components; as such details are not germane to embodiments of the present invention. It will also be appreciated that network computers, handheld computers, mobile phones, and other data processing systems which have fewer components or perhaps more components may also be used with embodiments of the present invention.

Referring to FIG. 7, in one embodiment, system 900 includes processor 901 and chipset 902 to couple various components to processor 901 including memory 905 and devices 903-904 via a bus or an interconnect. Processor 901 may represent a single processor or multiple processors with a single processor core or multiple processor cores 909 included therein. Processor 901 may represent one or more general-purpose processors such as a microprocessor, a central processing unit (CPU), or the like. More particularly, processor 901 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 901 may also be one or more special-purpose processors such as an application specific integrated circuit (ASIC), a field programmable gate array (FPGA), a digital signal processor (DSP), a network processor, a graphics processor, a network processor, a communications processor, a cryptographic processor, a co-processor, an embedded processor, or any other type of logic capable of processing instructions. For example, processor 901 may be a Pentium® 4, Pentium® Dual-Core, Core™ 2 Duo and Quad, Xeon™, Itanium™, XScale™, Core™ i7, Core™ i5, Celeron®, or StrongARM™ microprocessor available from Intel Corporation of Santa Clara, Calif. Processor 901 is configured to execute instructions for performing the operations and steps discussed herein.

Processor 901 may include an instruction decoder, which may receive and decode a variety of instructions. The decoder may generate and output one or more micro-operations, micro-code entry points, microinstructions, other instructions, or other control signals, which reflect, or are derived from, an original input instruction. The decoder may be implemented using various different mechanisms. Examples of suitable mechanisms include, but are not limited to, micro-code read only memories (ROMs), look-up tables, hardware implementations, programmable logic arrays (PLAs), and the like.

The decoder may not be a required component of processor 901. In one or more other embodiments, processor 901 may instead have an instruction emulator, an instruction translator, an instruction morpher, an instruction interpreter, or other instruction conversion logic. Various different types of instruction emulators, instruction morphers, instruction translators, and the like, are known in the arts. The instruction conversion logic may receive the bit range isolation instruction, emulate, translate, morph, interpret, or otherwise convert the bit range isolation instruction, and output one or more instructions or control signals corresponding to the original bit range isolation instruction. The instruction conversion logic may be implemented in software, hardware, firmware, or a combination thereof. In some cases, some or all of the instruction conversion logic may be located off-die with the rest of the instruction processing apparatus, such as a separate die or in a system memory. In some cases, the instruction processing apparatus may have both the decoder and the instruction conversion logic.

Processor 901 and/or cores 909 may further include one or more execution units coupled with, or otherwise in communication with, an output of the decoder. The term "coupled" may mean that two or more elements are in direct electrical contact or connection. However, "coupled" may also mean that two or more elements are not in direct connection with each other, but yet still co-operate or interact or communicate with each other (e.g., through an intervening component). As one example, the decoder and the execution unit may be coupled with one another through an intervening optional buffer or other component(s) known in the arts to possibly be coupled between a decoder and an execution unit. Processor 901 and/or cores 909 may further include multiple different types of execution units, such as, for example, arithmetic units, arithmetic logic units (ALUs), integer units, etc.

Processor 901 may further include one or more register files including, but are not limited to, integer registers, floating point registers, vector or extended registers, status registers, and an instruction pointer register, etc. The term "registers" is used herein to refer to the on-board processor storage locations that are used as part of macro-instructions to identify operands. In other words, the registers referred to herein are those that are visible from the outside of the processor (from a programmer's perspective). However, the registers should not be limited in meaning to a particular type of circuit. Rather, a register need only be capable of storing and providing data, and performing the functions described herein. The registers described herein can be implemented by circuitry within a processor using any number of different techniques, such as dedicated physical registers, dynamically allocated physical registers using register renaming, combinations of dedicated and dynamically allocated physical registers, etc. In one embodiment, integer registers store 32-bit or 64-bit integer data. A register file may contain extended multimedia SIMD registers (e.g., XMM) for packed data. Such registers may include 128-bit wide registers (e.g., XMM registers), 256-bit wide registers (e.g., YMM registers which may incorporate the XMM registers in their low order bits), and 512-bit wide registers, relating to SSE2, SSE3, SSE4, GSSE, and beyond (referred to generically as "SSEx") technology to hold such packed data operands. Wider instructions and/or registers such as 1024-bit or greater can also be applied.

Processor 901 and/or cores 909 may also optionally include one or more other well-known components. For example, processor 901 may optionally include instruction fetch logic, pre-decode logic, scheduling logic, re-order buffers, branch prediction logic, retirement logic, register renaming logic, and the like, or some combination thereof. These components may be implemented conventionally, or with minor adaptations that would be apparent to those skilled in the art based on the present disclosure. Further description of these components is not needed in order to understand the embodiments herein, although further description is readily available, if desired, in the public literature. There are literally numerous different combinations and configurations of such components known in the arts. The scope is not limited to any known such combination or configuration. Embodiments may be implemented either with or without such additional components.

Chipset 902 may include memory control hub (MCH) 910 and input output control hub (ICH) 911. MCH 910 may include a memory controller (not shown) that communicates with a memory 905. MCH 910 may also include a graphics interface that communicates with graphics device 912. In one embodiment of the invention, the graphics interface may communicate with graphics device 912 via an accelerated graphics port (AGP), a peripheral component interconnect (PCI) express bus, or other types of interconnects. ICH 911 may provide an interface to I/O devices such as devices 903-904. Any of devices 903-904 may be a storage device (e.g., a hard drive, flash memory device), universal serial bus (USB) port(s), a keyboard, a mouse, parallel port(s), serial port(s), a printer, a network interface (wired or wireless), a wireless transceiver (e.g., WiFi, Bluetooth, or cellular transceiver), a media device (e.g., audio/video codec or controller), a bus bridge (e.g., a PCI-PCI bridge), or a combination thereof.

Figure 8:
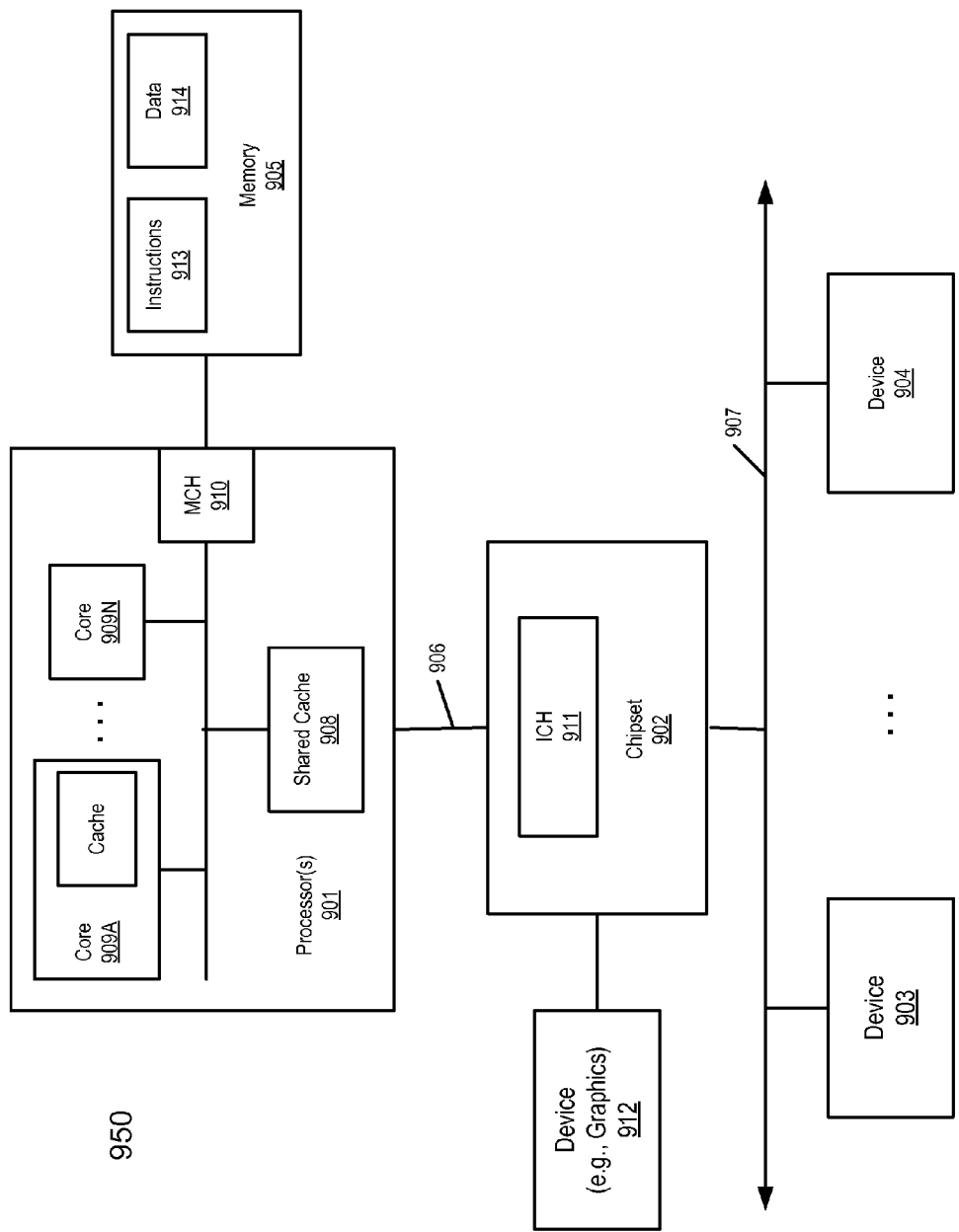
FIG. 8 is a block diagram illustrating an example of a data processing system according to another embodiment.

MCH 910 is sometimes referred to as a Northbridge and ICH 911 is sometimes referred to as a Southbridge, although some people make a technical distinction between them. As used herein, the terms MCH, ICH, Northbridge and Southbridge are intended to be interpreted broadly to cover various chips who functions include passing interrupt signals toward a processor. In some embodiments, MCH 910 may be integrated with processor 901. In such a configuration, chipset 902 operates as an interface chip performing some functions of MCH 910 and ICH 911, as shown in FIG. 8. Furthermore, graphics accelerator 912 may be integrated within MCH 910 or processor 901.

Memory 905 may store data including sequences of instructions that are executed by processor 901, or any other device. For example, executable code 913 and/or data 914 of a variety of operating systems, device drivers, firmware (e.g., input output basic system or BIOS), and/or applications can be loaded in memory 905 and executed by processor 901. An operating system can be any kind of operating systems, such as, for example, Windows® operating system from Microsoft®, Mac OS®/iOS® from Apple, Android® from Google®, Linux®, Unix®, or other real-time operating systems. In one embodiment, memory 905 may include one or more volatile storage (or memory) devices such as random access memory (RAM), dynamic RAM (DRAM), synchronous DRAM (SDRAM), static RAM (SRAM), or other types of storage devices. Nonvolatile memory may also be utilized such as a hard disk or a flash storage device. Front side bus (FSB) 906 may be a multi-drop or point-to-point interconnect. The term FSB is intended to cover various types of interconnects to processor 901. Chipset 902 may communicate with other devices such as devices 903-904 via point-to-point interfaces. Bus 906 may be implemented as a variety of buses or interconnects, such as, for example, a quick path interconnect (QPI), a hyper transport interconnect, or a bus compatible with advanced microcontroller bus architecture (AMBA) such as an AMBA high-performance bus (AHB).

Cache 908 may be any kind of processor cache, such as level-1 (L1) cache, L2 cache, L3 cache, L4 cache, last-level cache (LLC), or a combination thereof. Cache 908 may be shared with processor cores 909 of processor 901. Cache 908 may be embedded within processor 901 and/or external to processor 901. Cache 908 may be shared amongst cores 909. Alternatively, at least one of cores 909 further includes its own local cache embedded therein. At least one of cores 909 may utilize both the local cache and the cache shared with another one of cores 909. Processor 901 may further include a direct cache access (DCA) logic to enable other devices such as devices 903-904 to directly access cache 908. Processor 901 and/or chipset 902 may further include an interrupt controller, such as an advanced programmable interrupt controller (APIC), to handle interrupts such as message signaled interrupts.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The techniques shown in the figures can be implemented using code and data stored and executed on one or more electronic devices. Such electronic devices store and communicate (internally and/or with other electronic devices over a network) code and data using computer-readable media, such as non-transitory computer-readable storage media (e.g., magnetic disks; optical disks; random access memory; read only memory; flash memory devices; phase-change memory) and transitory computer-readable transmission media (e.g., electrical, optical, acoustical or other form of propagated signals—such as carrier waves, infrared signals, digital signals).

The processes or methods depicted in the preceding figures may be performed by processing logic that comprises hardware (e.g. circuitry, dedicated logic, etc.), firmware, software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A processor, comprising:
   one or more execution units to execute instructions, wherein each executed instruction to operate on a register operand having at least one element;
   a counter configured to count a number of instructions performing predetermined types of operations that haven been executed by the one or more execution units;
   one or more registers to allow an external component to configure the counter to count a number of instructions having a combination of a particular register size and a element size of each register operand of the executed instructions and to retrieve a counter value produced by the counter; and
   a retirement unit to retire instructions executed by the one or more execution units, the retirement unit configured to instruct the counter to count number of the instructions based on a combination of register/element size of each instruction retired, wherein the retirement unit is configured to
      for each instruction retired from the one or more execution units, determine a register size and an element size of the retired instruction,
      select a counter that has been configured to count number of instructions associated with the determined register size and element size, and
      transmit a signal to the selected counter to cause the selected counter to increment its count value.

2. The processor of claim 1, wherein the retirement unit is further to select and instruct the counters based on a number of elements operated on by the instructions.

3. The processor of claim 1, wherein the retirement unit is further to
   determine whether the instruction is a compound instruction that performs multiple predetermined operations per element, and
   transmit a signal to an associated counter to increment with an incremental value equivalent to a number of operations performed by the compound instruction per element.

4. The processor of claim 1, wherein the counter is further configured to count a number of first instructions having a first combination of a register size and element size and a number of second instructions having a second combination of register and element size that is different than the first combination.

5. The processor of claim 1, wherein a register size is one of 32-bit, 64-bit, 128-bit, 256-bit, 512-bit, and 1024-bit instruction width, and wherein an element size represents one of a single precision and double precision.

6. The processor of claim 1, wherein the external component is to compute a number of arithmetic operations performed by the instructions based on the counter value, including applying to the counter value a predetermined factor that is associated with the combination of register and element size.

7. A computer-implemented method, comprising:
   configuring a counter within a processor having one or more execution units to count a number of instructions performing predetermined types of operations, the one or more execution units to execute instructions, wherein each executed instruction to operate on a register operand having at least one element, wherein the processor having one or more registers to allow an external component to configure the counter to count a number of instructions having a combination of a particular register size and a element size of each register operand of the executed instructions and to retrieve a counter value produced by the counter;
   selecting and instructing the counter to count the instructions based on a combination of register/element size of each instruction retired from the one or more execution units by
      for each instruction retired from the one or more execution units, determining a register size and an element size of the retired instruction,
      selecting a counter that has been configured to count number of instructions associated with the determined register size and element size, and
      transmitting a signal to the selected counter to cause the selected counter to increment its count value;
   counting using the counter to count a number of instructions having a combination of a particular register size and element size executed by the one or more execution units; and
   providing access to the counter to allow an external component to retrieve a counter value produced by the counter.

8. The method of claim 7, wherein the retirement unit is further to select and instruct the counters based on a number of elements operated on by the instructions.

9. The method of claim 7, further comprising
   determining whether the instruction is a compound instruction that performs multiple operations per element, and
   transmitting a signal to an associated counter to increment with an incremental value equivalent to a number of operations per element performed by the compound instruction.

10. The method of claim 7, wherein the counter is further configured to count a number of first instructions having a first combination of a register size and element size and a number of second instructions having a second combination of register and element size that is different than the first combination.

11. The method of claim 7, wherein a register size is one of 32-bit, 64-bit, 128-bit, 256-bit, 512-bit, and 1024-bit instruction width, and wherein an element size represents one of a single precision and double precision.

12. The method of claim 7, wherein the external component is to compute a number of arithmetic operations performed by the instructions based on the counter value, including applying to the counter value a predetermined factor that is associated with the combination of register and element size.

13. A data processing system, comprising:
   a dynamic random-access memory (DRAM); and
   a processor coupled to the DRAM, the processor including
      one or more execution units to execute instructions, wherein each executed instruction to operate on a register operand having at least one element,
      a counter configured to count a number of instructions performing predetermined types of operations that haven been executed by the one or more execution units,
      one or more registers to allow an external component to configure the counter to count a number of instructions having a combination of a particular register size and a element size of each register operand of the executed instructions and to retrieve a counter value produced by the counter, and
      a retirement unit to retire instructions executed by the one or more execution units, the retirement unit configured to instruct the counter to count number of the instructions based on a combination of register/element size of each instruction retired, wherein the retirement unit is configured to
         for each instruction retired from the one or more execution units, determine a register size and an element size of the retired instruction,
         select a counter that has been configured to count number of instructions associated with the determined register size and element size, and
         transmit a signal to the selected counter to cause the selected counter to increment its count value.

14. The system of claim 13, wherein the retirement unit is further to select and instruct the counters based on a number of elements operated on by the instructions.

* * * * *